United States Patent [19]

Saraswat et al.

[11] Patent Number: 5,504,568
[45] Date of Patent: Apr. 2, 1996

[54] PRINT SEQUENCE SCHEDULING SYSTEM FOR DUPLEX PRINTING APPARATUS

[75] Inventors: Vijay A. Saraswat, Fremont, Calif.; Daniel G. Bobrow, Palo Alto, Calif.; Markus P. J. Fromherz, Palo Alto, Calif.; Timothy G. Lindholm, Palo Alto, Calif.; Pierre C. Berlandier, Nice, France; John H. Conley, Rochester, N.Y.

[73] Assignee: Xerox Corporation, Stamford, Conn.

[21] Appl. No.: 426,207

[22] Filed: Apr. 21, 1995

[51] Int. Cl.⁶ .................................................. G03G 15/00
[52] U.S. Cl. ........................... 355/308; 355/319; 395/111
[58] Field of Search .................................... 355/204, 308, 355/316, 319; 346/134; 347/153; 395/111; 358/296

[56] References Cited

U.S. PATENT DOCUMENTS

| | | | |
|---|---|---|---|
| 5,095,342 | 3/1992 | Farrell et al. | 355/319 |
| 5,095,369 | 3/1992 | Ortiz et al. | 358/296 |
| 5,107,299 | 4/1992 | Farrell et al. | 355/207 |
| 5,159,395 | 10/1992 | Farrell et al. | 355/319 |
| 5,179,410 | 1/1993 | Farrell et al. | 355/207 |
| 5,184,185 | 2/1993 | Rasmussen et al. | 355/308 |
| 5,187,587 | 2/1993 | Farrell et al. | 358/296 |
| 5,337,135 | 8/1994 | Malachowski et al. | 355/319 |
| 5,452,068 | 9/1995 | Farrell | 355/308 X |

*Primary Examiner*—Joan H. Pendegrass
*Attorney, Agent, or Firm*—R. Hutter

[57] ABSTRACT

A system dynamically schedules the creation of images in an on-demand printing apparatus outputting simplex and duplex prints. For each simplex print, a simplex print block is appended to a schedule of images to be created, and for each duplex print, a duplex print block is appended to the schedule. The duplex block includes two portions, one portion for each image in the duplex print, separated by a number of pitches which can be occupied by other images. The duplex and simplex blocks are then organized in a manner which preserves the desired final sequence of prints and minimizes the number of unused image pitches in the printing apparatus. The scheduling technique can also be applied to multi-pass color printing.

21 Claims, 5 Drawing Sheets

| LAST | add s | | add f- - -d | |
|---|---|---|---|---|
| | next | offset | next | offset |
| 1 | 3 | 0 | 10 | 2 |
| | 5 | 1 | 5 | 3 |
| | 9 | 2 | 14 | 4 |
| 2 | 4 | 0 | 11 | 2 |
| | 7 | 1 | 15 | 3 |
| | 10 | 2 | 13 | 4 |
| 3 | 5 | 0 | 12 | 2 |
| | 12 | 1 | 16 | 3 |
| | 8 | 2 | 14 | 4 |
| ⋮ | ⋮ | ⋮ | ⋮ | ⋮ |
| 16 | 11 | 0 | 9 | 2 |
| | 14 | 1 | 11 | 3 |
| | 1 | 2 | 13 | 4 |

PRINT SEQUENCE SCHEDULING SYSTEM FOR DUPLEX PRINTING APPARATUS

INCORPORATION BY REFERENCE

The following patents are incorporated by reference: U.S. Pat. Nos. 5,095,342; 5,095,369; 5,107,299; 5,159,395; 5,179,410; 5,187,587; and 5,337,135.

FIELD OF THE INVENTION

The present invention relates to a system for controlling a printing machine capable of producing single-sided (simplex) and double-sided (duplex) prints.

BACKGROUND OF THE INVENTION

On-demand page printers, wherein images are created in response to digital image data submitted to the printing apparatus, are familiar in many offices. Such printers create images on sheets typically using electrostatographic or ink-jet printing techniques. In work-group situations, wherein different users at various personal computers and other terminals submit jobs to a single central printing apparatus, various sets of digital image data, corresponding to jobs desired to be printed by different users, are typically kept in an electronic queue, and a control system typically located at the printer sorts through the image data and causes the printer to output the desired prints in an orderly manner.

Particularly with sophisticated printing apparatus, it may often be desired to print "duplex" prints, that is prints having images on both sides of the sheet. However, just about every currently commercially available printing apparatus is capable of producing an image only on one side of a sheet at a time. In order to obtain duplex prints, it is almost always necessary to provide an "inverter" within the printing apparatus. The purpose of an inverter is to handle a sheet after one side thereof has received an image, and in effect turn the sheet over to make the remaining blank side available to the same printing apparatus which created the first image. In effect, each duplex print is re-fed past the image-making portion of the printing apparatus so that the individual sheet becomes available to the image-making apparatus twice, once for each side.

A long-standing concern of designers of printing apparatus is how to optimize the use of a printing apparatus for situations wherein some desired prints are simplex and others are duplex. The fact that each duplex print has to be printed essentially twice causes a significant systemic problem with maintaining optimal or near-optimal operation of the entire printing apparatus. One simple solution, for example, would be to run every sheet along the duplex path, regardless of whether it is a simplex or duplex print, and in the case of each simplex print simply print nothing on the back side. While this solution is easy to implement, it provides the disadvantages of unnecessarily decreasing the output speed of the whole system. Another solution is to maintain duplex prints which are awaiting printing on the back sides thereof in a special buffer tray, until the system becomes available for printing the back sides of each sheet in sequence. The key disadvantage of this system is that a significant probability of error exists (a sheet may have the incorrect back side image placed thereon), and also the relatively intense handling of each print sheet in and out of the buffer tray substantially increases a likelihood of mechanical misfeed. Both such problems tend to result from the fact that sheets typically cannot be fed out of the buffer tray reliably. Even with a buffer tray, a fairly sophisticated scheduling system is required.

In electrostatographic printing apparatus, wherein images are first created on a photoreceptor in the form of a rotating drum or belt and then transferred to sheets, a key concern is the presence of blank pitches (image-sized spaces) along the drum or belt where, for various reasons relating to duplexing, no image is created. The problem with blank pitches is that each blank pitch represents lost productivity. In some duplexing schemes, the number of blank pitches along the belt may be comparable to the number of pitches actually having images on them. In such a situation, not only is the apparatus effectively running at half-speed, but various mechanical parts associated with the drum or belt will be experiencing wear to no productive purpose. Thus, as a general rule, the overall productivity of such printing apparatus is closely related to the number of blank pitches which result in the printing process.

In the prior art, certain patents, which are assigned to the assignee hereof and which are above incorporated by reference, have generally dealt with the problem of scheduling sheets in an imaging system having an endless duplex paper path loop. In general, these various patents disclose different techniques for overcoming the simplex-duplex problem in electrostatographic printing apparatus. Such techniques include simply finding blank pitches and using them as needed to print simplex prints or cycling down the printer between jobs where a finishing activity, such as stapling, requires an extraordinarily long time. Another technique involves causing sheets to move through the system at variable speeds. In contrast to these various systems, the present invention posits a system in which an optimized schedule for imaging sheets, given the knowledge of the desired output at a given time, is dynamically created in advance in the course of the printing process.

U.S. Pat. No. 5,095,371 discloses a general overview of a simplex-duplex printing system wherein various modular units, such as finishers, auxiliary paper feeders, and mail box units, each include a CPU which is connected to a central control system through an optical fiber cable.

SUMMARY OF THE INVENTION

According to the present invention, there is provided a method for scheduling a sequence of images created by an imager in a simplex-duplex printer comprising an imager for creating images on a side of a sheet and an inverter for inverting the sheet to enable the imager to create an image on another side of the sheet to make a duplex print. A data structure including a schedule having a plurality of pitch spaces is provided. For each simplex print to be made by the printer, a simplex block representative of the creation of the simplex print is entered into a pitch space in the schedule. For each duplex print to be made by the printer, a duplex block representative of the creation of the duplex print is entered into pitch spaces in the schedule, the duplex block comprising a front block representative of the creation of a first side of the duplex print and an end block representative of the creation of a second side of the duplex print. The front block and end block of each duplex block are spaced by a predetermined number of pitch spaces. A plurality of simplex blocks and duplex blocks are organized within the schedule so that a sequence of simplex blocks and end blocks corresponds to a desired sequence of simplex and duplex prints in a job. The sequence of simplex blocks and end blocks are optimized to minimize a number of blank pitch spaces within the schedule.

According to another aspect of the present invention, there is provided, in a printing apparatus for creating monochrome and multicolor prints, the printing apparatus including a rotatable image receptor for accumulating print material in imagewise fashion, a plurality of selectably-actuable development units disposed along a path of the image receptor for dispensing print material onto a latent image created on the image receptor, and an imager disposed along the path of the image receptor for creating latent images on the image receptor, the printing apparatus being controllable to cause the imager to create partial images of a desired multicolor image and to enable print material relating to a plurality of partial images to be superimposed on an image area of the image receptor by causing print material relating to partial images to be retained on the image receptor through a plurality of rotations of the image receptor, a method for scheduling a sequence of latent images created by the imager. A data structure is provided, including a schedule having a plurality of pitch spaces. For each monochrome print to be made by the printer, there is entered into a pitch space in the schedule a simplex block representative of the creation of the monochrome print. For each multicolor print to be made by the printer, there is entered into pitch spaces in the schedule a complex block representative of the creation of the multicolor print, the complex block comprising at least a first block representative of the creation of a first partial image of the multicolor print and an end block representative of the creation of a final partial image of the multicolor print, with the first block and end block of each complex block being spaced by a predetermined number of pitch spaces. A plurality of simplex blocks and complex blocks are organized within the schedule so that a sequence of simplex blocks and end blocks corresponds to a desired sequence of monochrome and multicolor prints to be output. The sequence of simplex blocks and end blocks is optimized to minimize a number of blank pitch spaces within the schedule.

DETAILED DESCRIPTION OF THE INVENTION

A. Duplex Printing Apparatus

Figure 1:
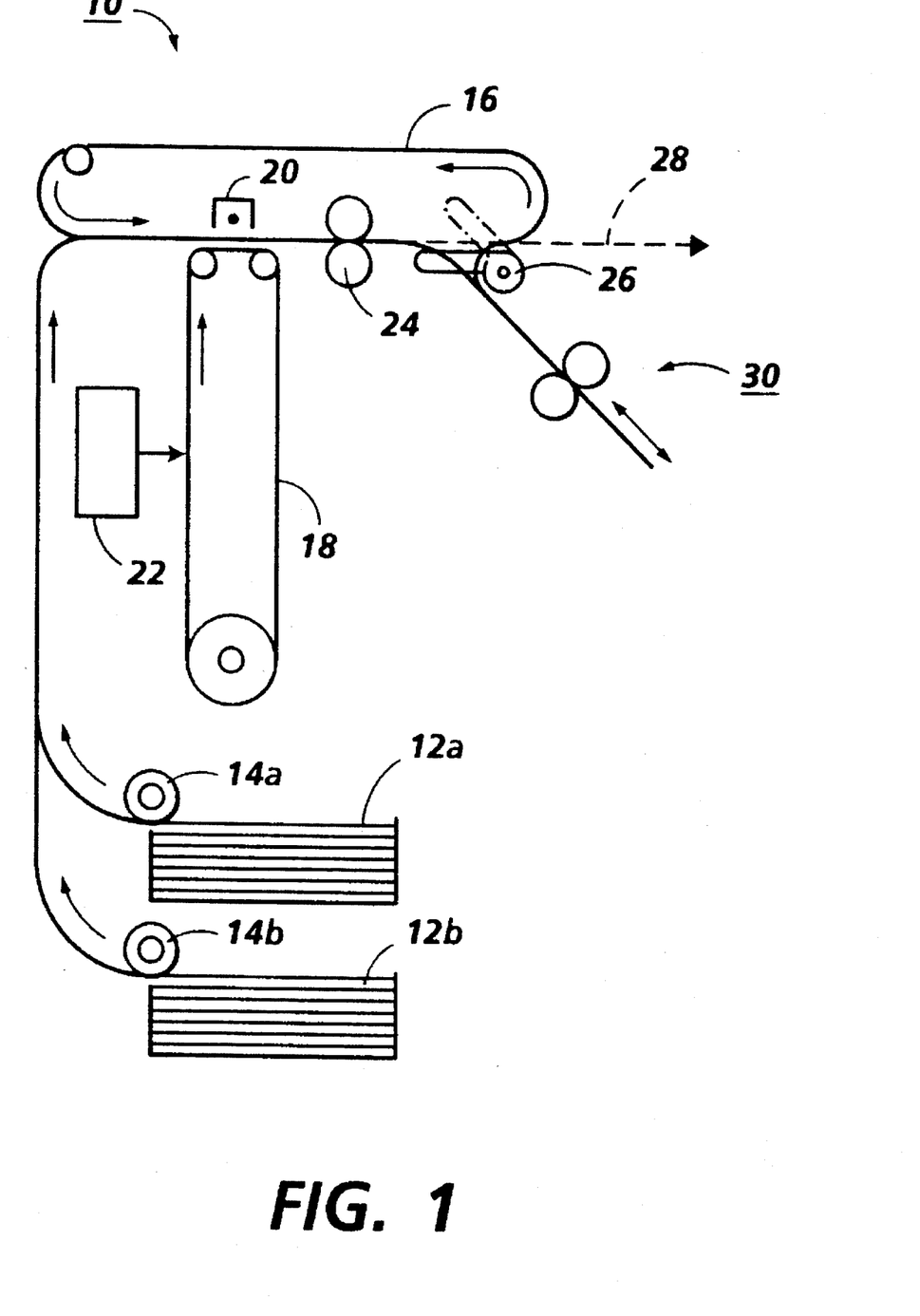
FIG. 1 is a simplified elevational view showing the relevant parts of a duplex printing apparatus, on which the system of the present invention may operate.

FIG. 1 is a simplified elevational view of the paper path of an on-demand printing apparatus, capable of simplex or duplex output, in which a stream of digital video signals representative of images desired to be printed causes the desired images to be formed on a selected side of a print sheet. The particular architecture shown in FIG. 1 is for an electrostatographic printer, but it will be understood that the principle of the invention could apply equally to other types of image-creation technologies, such as ink-jet printing. The printing apparatus, generally indicated as 10, contains one or more stacks of available sheets on which to print images, these stacks being indicated as 12a and 12b. The sheets of paper in the stacks 12a and 12b may differ in, for example, size, color, or the presence of a pre-printed letterhead. When it is desired to create an image on a sheet, a sheet of a desired type is drawn from a stack such as 12a or 12b, such as by respective feeders 14a, 14b, and the individual sheet is fed onto duplex loop 16.

Duplex loop 16 is typically in the form of an endless belt which is capable, by means of friction, static electricity, vacuum, or other means, of retaining a plurality of sheets thereon, thereby retaining a particular sheet until it is time for the sheet to receive an image on the side of the sheet facing outwardly from the belt of the duplex loop 16. In the architecture shown in FIG. 1, it is intended that sheets "ride" on the outer surface of the belt of duplex loop 16. Along one portion of duplex loop 16, the belt of duplex loop 16 comes into close contact with a photoreceptor belt indicated as 18. At the point of close proximity of duplex loop 16 and photoreceptor belt 18, there may be provided a transfer corotron 20, the function of which will be familiar to one of skill in the art of xerography.

In the xerographic-based embodiment of a printing apparatus shown in FIG. 1, a device which shall be here generally referred to as an "imager" creates an electrostatic latent image on the surface of photoreceptor 18. Imager 22 has the function of receiving a sequence of digital signals representative of the desired image to be printed, and outputs a physical manifestation, such as a modulated laser scanning beam, to imagewise discharge selected areas on the photoreceptor 18 to create an electrostatic latent image representative of the image desired to be printed. As is known in the art of electrophotography, other stations along the path of photoreceptor 18, such as a charging bar and development unit (not shown) are also required to create the desired developed image on the photoreceptor belt 18. This developed image, which is typically in the form of a reverse image in toner particles on the photoreceptor 18, is then made available to a sheet which rides on the outer surface of duplex loop 16.

After an image is created on the photoreceptor belt 18 by imager 22, and developed (by means not shown), the motion of photoreceptor belt 18 causes the developed toner image to be in close proximity or in contact with a sheet, originally from stack 12a or 12b, which is riding on the outer surface of duplex loop 16. At transfer corotron 20, the toner particles arranged in imagewise fashion on photoreceptor 18 are electrostatically transferred to the surface of the sheet by transfer corotron 20. Soon thereafter along the path of duplex loop 16, the toner image on the sheet is passed through a fuser 24, which causes the toner image to be fixed permanently on the outer surface of the sheet, in a manner known in the art. Thus, immediately downstream of fuser 24, there will be created a sheet having a desired image on the side thereof which faces outward along the duplex loop 16. If at this point the sheet having the image thereon is desired to be output from the system, a device such as router 26, a simple design of which is shown in FIG. 1, but which may be of any number of designs known in the art, will cause the sheet to be disengaged from the duplex loop 16 and output from the printer such as through the path indicated by arrow 28. This output sheet can either be directly output into a tray for pickup by the user, or may be sent to a sorting or stapling device according to the larger architecture of the printing apparatus.

To create a duplex print, that is, a print having one desired image on one side thereof and another desired image on the other side thereof, it is necessary to make the other side of the sheet available to the photoreceptor belt 18, by causing the other side of the sheet to face outward while the sheet rides on the outside of duplex loop 16. For this purpose there is provided along the duplex loop 16 a device generally indicated as inverter 30. The basic purpose of inverter 30 is to pick off a sheet from duplex loop 16 which has an image already placed on the outward-facing side thereof, and in effect turn the sheet over so the other, "non-printed" side of the sheet faces outward as duplex loop 16 re-feeds the sheet for another cycle so that photoreceptor belt 18 can place another desired image on the other side thereof. In brief, inverter 30 operates by temporarily removing the sheet from the duplex loop, feeding it in one direction, and then re-feeding it back onto the duplex loop 16, such as indicated by the double-headed arrow next to inverter 30. Various designs of an inverter 30 are available to one of skill in the art. Once again, the purpose of the device shown as router 26 would be to selectably cause the sheet to be output along path 28, or to enter inverter 30, depending on whether the particular sheet passing therepast is a simplex print, the first side of a duplex print, or the second side of a duplex print.

Returning to imager 22, it will be evident that the stream of video signals being entered into imager 22 must relate to the desired sequence of simplex and duplex images to be created on photoreceptor 18 and ultimately transferred to one side or another of the sheet being fed along duplex loop 16. The physical configuration of duplex loop 16 mandates that the images placed on sheets around the duplex loop 16, and therefore images placed on photoreceptor belt 18 by imager 22, must be placed in an order such that, for a duplex print, an image placed on one side of a particular sheet at one time will determine when the inverted sheet is available for placement of a desired image on the other side of the sheet.

It will be noted that the specifically electrostatographic aspects of the apparatus shown in FIG. 1, such as the photoreceptor 18, imager 22, and transfer corotron 20, could be replaced by equivalent apparatus for other techniques for creating images on one side of a sheet, such as an inkjet printhead. Also, imager 22 as here described assumes that the user has unlimited control over the order of page images (the "digital video") being output through imager 22. If, however, the original source of images to be created is itself a set of automatically fed hard-copy images, i.e. if the printing system as a whole is operating as a copier, the feeding of originals will also create certain constraints on the optimal order of images created with the printer. It is probably preferable to digitize (convert to digital signals) the original hard-copy images, electronically store the resulting data, and apply the data as required to a digitally-based imager 22.

In the particular embodiment shown in FIG. 1, it is evident that, after a front-side image is placed on a sheet at transfer corotron 20, this sheet is picked off duplex loop 16 by router 26, inverted by inverter 30, and placed back on duplex loop 16, where the inverted sheet will again become available to receive an image from photoreceptor 18 at a time in the future after the inverted sheet makes its way around duplex loop 16. Thus, for a duplex print, the creation of the front-side image by imager 22 must be spaced by a fixed time period from the creation of the back-side image on the same sheet; this time difference is ultimately dependent on the size of the sheet relative to the overall length of the duplex loop 16. Given a fixed-speed paper path, the only sheet-size-related difference is due to the inverter 30; if a longer sheet has to be driven farther into inverter 30 to invert the sheet, the extra length in and out of inverter 30 changes the length of the duplex path. If the duplex loop 16 is longer, will be more time will be required for the back side of the sheet to come around to photoreceptor 18, and therefore a longer time spacing would be required between the outputting of the front-side image from imager 22 and the back-side image.

In a practical application of a duplex printer, an operating parameter which is more useful than the timing between the production of particular images is the number of "pitches" along the length of either the photoreceptor belt or the duplex loop. A "pitch" is a length of the duplex loop or photoreceptor belt corresponding to an image of the size to be printed, such as 8.5×11 inches or "A4". For example, a typical practical length of a duplex loop 16 is four pitches; that is, for letter-sized images to be printed, the duplex loop 16 is of a length wherein four such images, or four such sheets, could be retained on the duplex loop 16 at a particular time along the circumference thereof. What this also means is that duplex loop 16 is capable of, in effect, temporarily storing up to five such sheets at a time between the time any individual sheet receives an image on one side thereof and gets ready to receive an image on the other side thereof. This "capacitance" of the duplex loop 16 will of course have a direct effect on the spacing, and number of pitches, between the output of a front-side image by imager 22 and a back-side image for the sheet from imager 22. It will also be apparent that, if a larger size print, such as 11×17 inches, is desired to be printed, the effective capacitance of duplex loop 16 will be lower, such as two or three pitches, because only two or three such large sheets could be retained along the circumference of duplex loop 16 at a particular time.

B. Scheduling of Simplex and Duplex Prints

Having explained the physical parameters of a duplex-capable printing apparatus capable of being optimally controlled by the system of the present invention, attention is now directed to the specific techniques according to the present invention.

In a networked printing environment, it is likely that any number of a large population of users may at any time access the printer 10 for printing of various jobs which may be duplex, simplex, or a combination of the two. As mentioned above, for efficient long-term use of the printer 10, it is desired that this incoming stream of jobs to be printed be organized such that a minimum of the resources of the printer 10 are wasted. In practical terms, this optimal usage translates into a minimal use of blank pitches along the length of photoreceptor 18. Any blank pitch along photoreceptor belt 18 represents a wasted resource, in that a blank pitch could conceivably have been put to use in producing a desired image. It is a key function of the system of the present invention to create an optimal schedule of images to be output by imager 22 to optimize the function of the entire printing apparatus 10.

In order to perform this scheduling function, according to the present invention there is provided a data structure, such as a portion of computer memory, which retains instructions for the imager 22 on which of an available set of images to be printed are to be printed at a given time and in what sequence. In this available memory space, a schedule is constructed in an ongoing manner. This schedule is a continually-changing list of which page images will be placed on the photoreceptor 18 by imager 22 in the immediate future.

According to the present invention, every time a request to print a simplex or duplex sheet is received by the control system of the printing apparatus, there is entered into the schedule a "block" corresponding to the print desired to be printed. The nature of this block will depend on whether a simplex or a duplex print is desired. For a simplex block the imager 22 is concerned with the printing of only one image, and therefore the schedule need require a unitary block, which can be rendered as s. For every duplex print desired to be printed, the block entered into the schedule will have two parts, representative of the front (f) and back (called d, in reference to being the final image in the duplex print) image on the same sheet. This "duplex block" will appear as something like f - - - d, with the dashes representing available empty pitches between the creation of the front image f and the back image d. The duplex loop length is the distance from start of the front page to start of the back page. In the particular example shown, the duplex block f - - - d corresponds to a duplex loop 16 having four pitches; after the front image f is created, the imager 22 must wait for three blank pitches to print the back image d. If, for example, the relative sizes of the images to be printed and the duplex loop were seven pitches per duplex loop, the duplex block may look like f - - - - - - d, and if the duplex loop were three pitches in length, the duplex block would look like f - - d. The varying total length (in pitches) of the duplex block relates directly to how long a sheet will travel on duplex loop 16 before it moves past the transfer corotron 20 again to receive another image.

In determining how many pitches exist between the f and d blocks within the duplex block, other physical considerations may have to be taken into account, such as the amount of leftover space when documents of a particular size are placed on the duplex loop. If sheets of different sizes are desired to be mixed along the duplex loop, it might be necessary to assign a finite length to a block or a portion of a block: for instance an 11×17 sheet will in effect take up two "normal" 8.5×11 pitches on the duplex loop, and the blocks representative thereof must reflect this. Also, the position and behavior of the inverter may also have an effect on the exact nature of different duplex blocks; for example, the time spent for a sheet entering and exiting the inverter 30 may have the effect of adding one or more pitches along the duplex loop 16.

To make a general statement about the configuration of a duplex block for particular hardware, in a printing apparatus there will be required one pitch for the imager, i pitches for inversion of a particular size sheet, and b pitches for the duplex belt. For example, an 8.5×11 sheet may take one pitch to invert, and an 11×17 sheet may take two such pitches to invert. The duplex loop length is the sum of these, i.e. 1+i+b. If, to take one example, the duplex belt is three pitches long, the duplex loop length for 8.5×11 sheets is 1+1+3=5 pitches, and for 11×17 sheets, 1+2+3=6 pitches (all 8.5×11 inch pitches). In this example, this means that it takes five pitches from printing the front to printing the back side of an 8.5×11 sheet. Thus, for configuring a duplex block, there is required i+b blanks between f and d (or one less than the duplex loop length), so for 8.5×11 sheets in this example, the duplex block would be represented as f - - - - d.

Taking the four-pitch embodiment of a duplex loop as the example, it will be noted that the three blank pitches between the f and d images in the duplex block are potentially available for the creation of images of other prints. These blank pitches appear not only along the circumference of the duplex loop 16, but also the photoreceptor belt 18. If the blank pitches between the f and d blocks for each duplex image can be utilized to print other pages, fewer blank pitches will be necessary and therefore the system as a whole will be faster and more efficient. Thus, if one wished to print three consecutive duplex prints, one could concatenate the three f - - - d blocks as f f f - d d d. By having the imager 22 output the sequence of images in this way, almost the full capacitance of the duplex loop is utilized, with only the one blank pitch in the middle being required to maintain the proper spacing between the f and d of each f - - - d block.

When producing a mix of simplex and duplex prints, either within a single job, or where one type of job immediately follows a job of the other type, it will also be possible to insert simplex images in the blank pitches between the f and d images of a duplex job, such as to create a sequence f - s s d. As it happens with the particular hardware architecture shown in FIG. 1, the requirements of the inverter 30 are such that a simplex print s cannot immediately follow the creation of a portion of a duplex print for d. Thus, in the sequence of prints output by the printer 10, and thus also by imager 22, the sequences f s and d s are physically impermissible. Further, in one embodiment of a printing apparatus similar to that shown in FIG. 1, the sequence f d is physically impermissible as well. These physical constraints on certain sequences can be built into the control system of the present invention, in a manner which will be described in detail below.

To take an example of combined simplex-duplex printing for a particular job, consider a case in which the desired output is a simplex print, followed by a duplex print, then another simplex print, and finally another duplex print; or in shorthand s d s d. It will be noted that every ultimate output of the printer 10 must be either a simplex prints or the second side d of a duplex print. In this case, one best solution to the problem of assigning photoreceptor and duplex loop pitches in the printer would be to have the imager 22 output the images as f - - sdf - s - d. It will be noted that this sequence of prints retains the sdsd final sequence of desired print outputs, while also preserving the f - - - d spacing between duplex images, and also avoids the impermissible f s, d s, and f d sequences which are prohibited by the physical structure of the inverter 30. Incidentally, to take another example of another physical architecture, wherein the fd sequence happened to be permissible, then an even more efficient (i.e., fewer blank pitches) sequence would be possible: f - sfd - sd. Once again, the sdsd sequence of prints as they are output is here preserved. It is the function of the optimization step of the present invention to obtain the most efficient sequence of s, f, and d image creation given a particular desired final output of simplex and duplex prints such as s d s d.

Because in the networked-printer context, requests for printing various simplex or duplex prints will enter the control system essentially randomly, an optimization technique for determining the most efficient sequence of f, d, and s images will have to reassess the most efficient sequence given both its current state of prints it has already committed to making, and the addition of each new print which is desired to be printed. Generally, different embodiments of the present invention rely on one or both of the following optimization techniques: the "greedy-algorithm" technique, and the "forward reach-back" technique. The greedy-algorithm technique can further be divided into a forward greedy-algorithm technique and a backward greedy-algorithm technique.

C. "Forward Reach-Back" Optimal Scheduling Technique

Turning first to the "reach-back" technique for creating an optimal sequence of image creation, it should be noted that, given a block and a schedule, the block can only reach back into and affect the schedule up to a finite length. In other words, in the example where, because of the length of the duplex loop 16 and the size of the desired prints, only four sheets may be retained along the circumference of duplex loop 16 at any time. Therefore, a control system which is scheduling prints on an ongoing basis, upon receiving a request to do another print, can "reach back" four pitches or images into the existing schedule from imager 22 in order to insert a new simplex or duplex block for the latest requested print.

With the reach-back optimization technique, the control system looks at the present allocation of the last four pitches in the currently-scheduled list of images to be created and then determines whether or not the new s (for a simplex image requested) or f - - - d (for a duplex print requested) can be placed at a given offset, taking into account both the requirement of adding a minimum number of blank pitches, and also the physical constraints such as avoiding the f s, d s, or f d sequences. As used herein, the term "offset" refers to the selection of which available blank pitch receives the new block added to the schedule. For example, when scheduling in the forward direction, if the end of the schedule is f - - - d, a new s could be added at zero offset to make the new ending f - - - d s, while placing the s at offset one would make the schedule f - - - d - s, and placing the s at offset two could make the schedule f - - - d - - s. The significance of the "offset" concept will become apparent as the invention is described in detail below.

A central idea behind the present invention is that every new block added to an ongoing schedule is fit into the end of the sequence of prints to be made, with the number of possible variations to the schedule being less than or equal to the number of pitches in the reach-back. What makes the forward reach-back work is that it proactively accounts for blocks that might get placed in the schedule later. For example, if the last pitch spaces in the sequence are f - - - d, a subsequent block could fit into four possible blank spaces (i.e., one of the blank pitches within the block, or a position after the end block). But when successive blocks are scheduled, the number of possible ways of scheduling numerous successive blocks increases exponentially. What keeps the scheduling manageable with the present invention is that the number of variations is limited by the length (number of pitch spaces) of the reach-back; thus, only a manageable number of schedule variations need be considered at any time.

When determining where to place the block (either s or f - - - d) for the latest-requested print, the optimization system will first look at what pitch spaces are available in the last scheduled pitch spaces within the reach-back, in this example in the last four pitch spaces. If there are blank spaces within the last scheduled pitch spaces, it would be desirable to insert an f image in one of those blank pitch spaces, if possible, consistent with the physical constraints. As it happens, in this particular embodiment, the configuration of available blank letter-size pitch spaces in the last four scheduled pitch spaces can be of one of only 16 possible configurations; that is, at any time in the course of printing a stream of prints, the last four pitches in the schedule can be conifigured in only 16 ways. When either an s or an f - - - d, representing a newly-requested simplex or duplex print, is added at the end of the schedule, at the given offset, the new end will simply change to another of the 16 possible endings of the schedule. Addition of another s or f - - - d request will result in another transition from one ending of the 16 to another ending of the 16; the response of one possible ending to either a simple or duplex request (at a given offset) will always remain in the closed system of 16 possible endings.

With this in mind, a "transition table" can be constructed, in which the 16 possible endings of the last four pitch spaces in the schedule, numbered 1–16, exist in one column while in a second column exists the lists of endings that result when an s print request is added to each of the endings, at each of the possible offsets. In another column are the lists of endings that result when an f - - - d request is added onto a given ending in the first column, at each of the possible offsets. The last two columns will have no more than the same set of numbers 1–16 as the first column, but in a different order. For example, if we start with an arbitrary ending numbered 1, addition of an s at offset 0 may result in a new ending which is identical to ending 16 in the initial list, while an optimal addition of f - - - d at offset 0 may result in a new ending identical to another numbered ending in the original list. If the s is in fact added to ending 1, the next iteration will start with ending 16 in the first column and then go on with a new ending from within the same list of 16, depending on whether the next print request is an s or an f - - - d. Significantly, the new ending will always be within the original set of 16 possible endings. This closed system is the "transition table" by which, when the inputs are the current configuration of available pitch spaces at the last four pitches of the schedule and the type of requested new print, either s or f - - - d, the output will be a new ending from the list of 16 possible endings, and will serve as the input for the next iteration.

In general, and disregarding for the moment the sources of other possible constraints such as belt seams, the number of possible constraints is determined by the number of available pitch spaces and the types of entries made into the available pitch spaces. In the present case, there are four pitch spaces, and for present purposes all that matters is whether a particular pitch space is occupied by an image or not: each pitch space thus has two options. Four available pitch spaces with two options each implies $(4)^2=16$ possible ending patterns. However, if one were to provide a more sophisticated system, where the actual identity of a pitch space were relevant, each pitch space could be occupied by s, f, d, or -. Four pitch spaces with four options each would require $(4)^4=256$ possible endings. A system in which the inversion of a sheet is relevant provides three options (image up, image down, blank) for each pitch space, over four pitch spaces, would yield $(4)^3=64$ possible patterns. Additional details about the characteristics of each pitch space, beyond the basic question of whether it is occupied by an image or not, may be relevant in permitting the system to conform to other external constraints; e.g., a stapler downstream of the inverter may require that all s images be face-up, or a particular design of inverter may have unique forbidden image sequences which must be taken into account.

Figure 2:
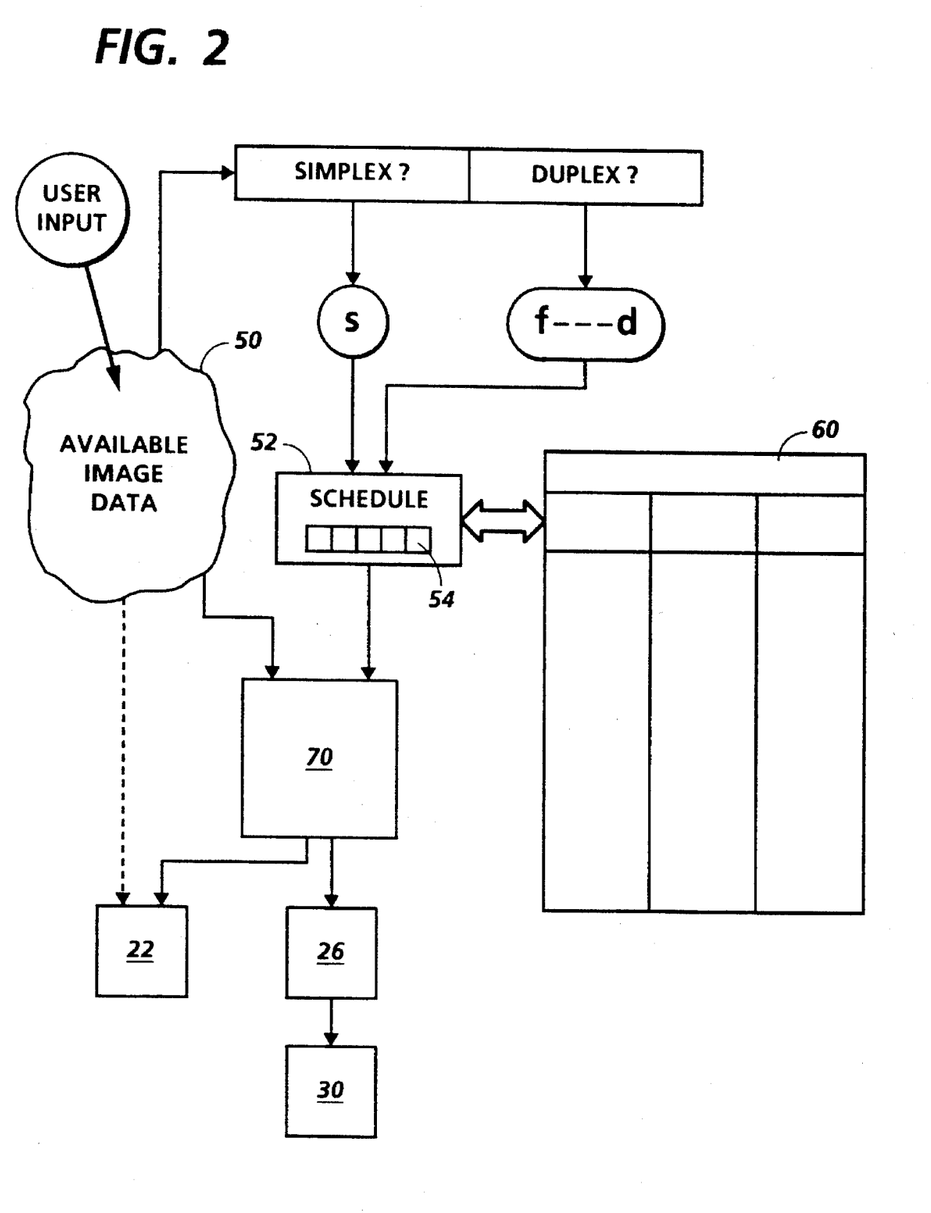
FIG. 2 is a systems diagram showing the essential parts of the control system of the present invention.

FIG. 2 is a diagram representing an overview of the exchanges of data within the system of the present invention for the reach-back scheduling technique. First, a user accessing the printer sends a quantity of image data into a queue indicated as 50. At this stage, the queueing of various jobs to be printed is the province of any job-queueing system which would be familiar in any networked printer. As image data emerges from the queue 50 when it is to be printed, the first inquiry is whether a particular print to be printed emerging from the queue is a simplex or duplex print. A data structure, such as a random-access memory, here indicated as 52, maintains a schedule of what images in the queue are to be output in what order. As such, the schedule 52 in the memory will contain any number of "pitch spaces," meaning a buffer of discrete memory locations in which a continually-updated schedule of image order is maintained. Of these pitch spaces, the last five, here indicated as 54 within schedule 52, are of interest, because within the last four pitch spaces a new simplex or duplex print desired to be printed may be scheduled. When a simplex print is desired to be printed and emerges from queue 50, an s block is entered into the schedule 52; when the latest desired print to emerge from the queue is a duplex print, a duplex block f - - - d is entered into schedule 52. The pitch spaces 54 in schedule 52 thus represent a running monitor of the available pitch spaces along photoreceptor 18 or duplex loop 16 as a possible schedule is created.

Once the new schedule for the last pitch spaces is determined by the transition table 60, this schedule is then used to control, such as through central controller 70, the eventual output of the printer 10. Many different aspects of the printer 10 are controlled in the course of printing documents, but the particular elements of most interest here are the imager 22, as well as the router 26 and the inverter 30. Controller 70 instructs imager 22 to create images on photoreceptor 18 in the determined optimal sequence; in order to perform the actual imaging, the actual image data for these images is retreived and entered into imager 22, in a manner which would be apparent to one of skill in the art of high-speed network printers. The behavior of router 26 and inverter 30 will of course depend on the presence of a duplex print in the sequence; in general once a front-side f is transferred onto a sheet on duplex loop 16, router 26 and inverter 30 will cooperate to invert the sheet. If, however, the most recent output at photoreceptor 18 is an s simplex print or a d second side of a duplex print, router 26 will generally cause the finished print to be output from the printing apparatus.

Having explained the general principle of applying blocks, each block representing a simplex or duplex print, in a field of pitch spaces, for a particular embodiment of a printer, certain subtleties become apparent when considering applying the principle more generally. For example, the configuration of duplex blocks will vary depending on the size of the sheet being considered; if the sheet being printed is of such a size that only two or three (instead of four) sheets can fit along the duplex loop, the duplex block will have a different appearance. As mentioned above, larger sheets will take more time to be inverted by inverter 30, and therefore different sized sheets may require different constraints as to what type of block can follow which. Further, under certain conditions (such as with a binding apparatus downstream of the printer), it may be desirable to invert a particular sheet, either a simplex or duplex, after it has been completely printed; that is, for various reasons it may be desirable to output a print either "face-up" or "face-down." In such a case, it will be apparent that further inversion constraints may be required beyond the prohibited sequences mentioned above.

Figure 3:
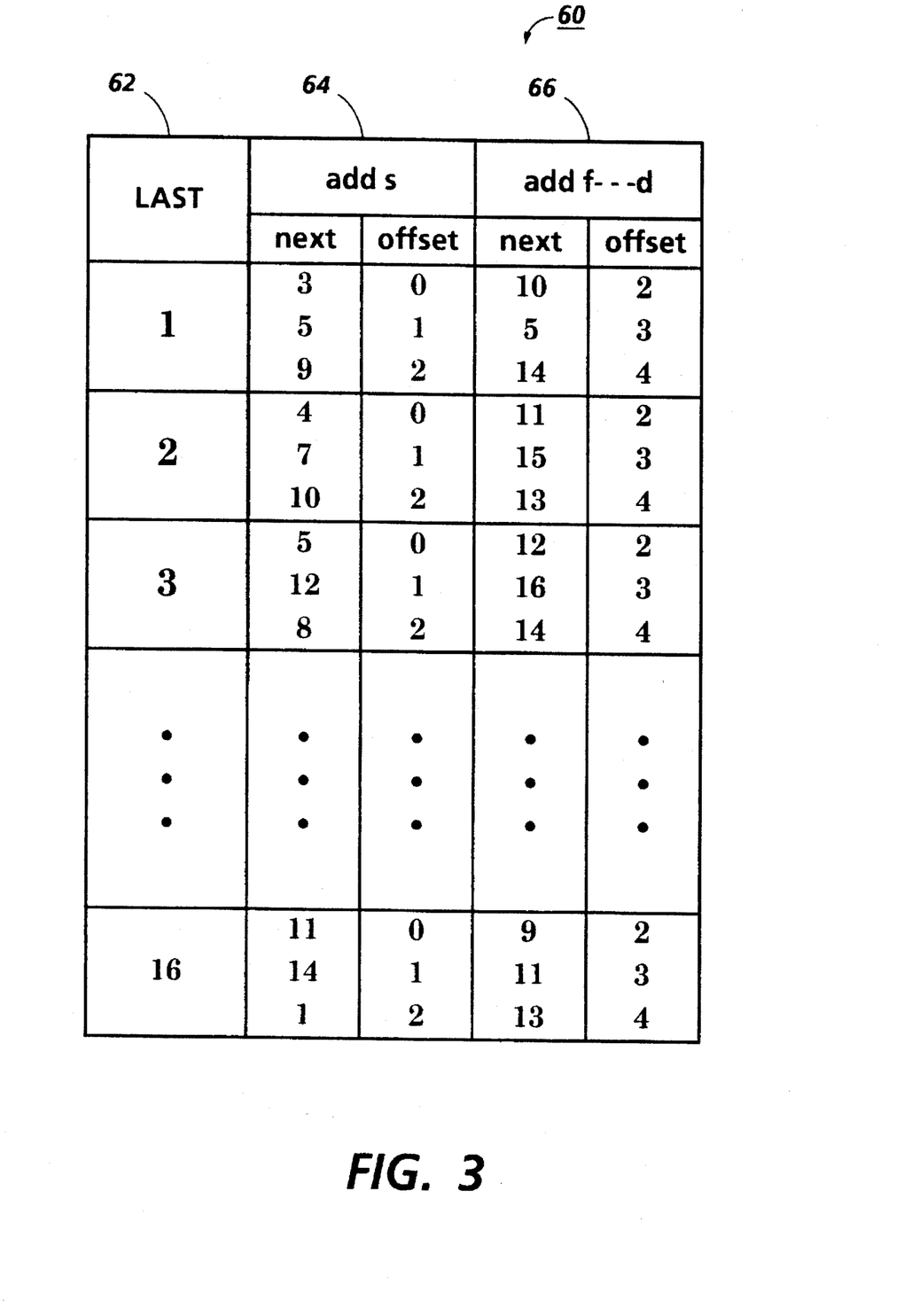
FIG. 3 is a portion of an example "transition table" as used in one embodiment of the present invention.

Schedule 52 interacts with a transition table 60, which is shown generally in FIG. 2; an example suitable for the illustrated embodiment of a printer is shown in FIG. 3. Transition table 60 may have any structure known to computer programming, but in effect includes three tables 62, 64, and 66 as shown in FIG. 3. The schedule 52 identifies the configuration of available pitch spaces 54, and recognizes it as being one of the 16 possible endings, which are numbered in column 62. The addition of a further s or f - - - d print, the transition table 60 will refer to either column 64 or column 66 to obtain the optimal new ending for the last four pitches 54. These new endings can be identified, as shown, as different ones of the possible endings 1–16 in column 62. In the next iteration, when the next print is requested and entered into schedule 52, that new ending from column 64 or 66 is used as the input into column 62.

In accumulating schedules for a long sequence of prints desired to be made, it will be apparent that a large number of possible "paths" (sets of choices of transitions) will be created which can result in the desired output sequence, and the number of possible paths will increase with each new print added to the schedule. Up to (and perhaps beyond) the beginning of printing, all of these paths are preferably retained in memory. The reason for maintaining multiple paths in memory is to allow pitch spaces for possible front-side images which may be submitted in the future. After a number of possible transitions are recorded, several of the new states may be identical, in which case only the states with the shortest total schedule length are retained as possibly useful. Only when executing the scheduling, i.e., actually performing the printing, does the system of the invention finally choose the shortest transition from the table. By saving final decisions about the precise order of prints being formed until the last possible moment, a forward-based schedule with an optimally small number of skipped pitches can be created on an ongoing basis. Of course, whether the selected path is shortest (i.e., provably optimal) for the entire job cannot be known unless the entire desired output sequence is known; particularly in a networked environment with various users submitting jobs at random times to a central printer, the "job" may not have a definite end. Nonetheless, selection of the shortest schedule at run-time can provide the optimal schedule, given all of the known job information at the time of printing.

D. "Greedy-Algorithm" Optimal Scheduling Technique

An alternate technique to "reach-back" scheduling described in the previous section is the "greedy-algorithm" technique. Under the greedy-algorithm technique, whenever a new print request is added to the end schedule, it is merely placed in the first available pitch space which minimizes the number of "offsets" (the number of delay pitches before the output of the most recently-added block) and does not violate any other physical constraint. If, for example, the last five pitches are f - s - d, the addition of an extra s following the d would make the new ending f - s - d - s (because d s is an impermissible sequence).

The reason this technique is called "greedy algorithm" is that the optimal solution for each individual iteration (addition of a new print to the schedule) may not result in an optimal, most efficient sequence over many iterations. For example, if at machine turn-on the requested output is a simplex and then a duplex print, or s d, under the greedy algorithm the f - - - d of the duplex will simply be appended to the s, yielding a sequence of s f - - - d, which wastes three pitch spaces. After having scheduled the s in the first iteration, the greedy algorithm has no ability to "reach back" to put the f of f - - - d before the s. However, f - s - d, a preferable schedule for the whole s d job because it uses fewer pitch spaces, would have been discovered by use of the transition table in the reach-back technique. A greedy algorithm, which determines the most efficient addition to the schedule with each iteration without considering cumulative effects, would not have been able to place the f of the second print before the s of the first print.

Having stated that the greedy-algorithm technique does not yield an optimally efficient schedule in the long run, the greedy algorithm technique has the key advantage of being easy to implement in a real scheduler, and in many cases provides near-optimal results in the long run. If it could be known in advance what the entire job looked like in terms of the sequence of simplex and duplex prints, one could start at the end and compile at least a near-optimal schedule by compiling the list of required simplex and duplex prints from the end and working to the beginning.

The following is an example of how a backwards greedy-algorithm techgnique can be used to construct an optimal schedule for a desired example output of s d d s d. One starts at the end of the desired sequence, and keeps adding blocks for the previous print to the beginning of the schedule, keeping the total sequence length to a minimum while avoiding the impermissible sequences fs, ds, fd:

| start with final d: | f - - - d |
|---|---|
| add s: | f - - sd |
| add d: | f - - - df - - sd |
| add previous d: | ff - - ddf - - sd |
| end with first s: | ff - sddf - - sd |

The disadvantage of this backward greedy-algorithm technique is that one must know beforehand the complete extent of the job, and this limitation may preclude use of a network with a number of users randomly submitting jobs to the printer at various times. However, backward greedy-algorithm scheduling is a valid technique for obtaining an optimally efficient schedule without use of a transition table.

One advantage of the greedy-algorithm forward technique is that in many cases it will yield results identical to the reach-back technique, and the technique is easy to implement in a real-time controller. In order to implement a forward greedy-algorithm technique, one merely looks at the last relevant pitch spaces and inserts the new s or f - - - d in the first available space which does not violate the impermissible sequences of f s, d s, or f d, and which minimizes the addition of blank pitches to the schedule; this conceivably can be done in a few lines of code. Greedy-algorithm scheduling, either forward- or backward-based, thus requires relatively little memory.

It should also be mentioned that a "backward reach-back" technique, that is, a reach-back scheduling technique applied to a backward list of images desired to be printed, may conceivably provide some advantages over either the backward greedy-algorithm technique or the forward reach-back technique which have been described in detail above. Under such a method, one begins with the desired sequence of images to be printed, and then applies a reach-back technique, such as described above, to the sequence in reverse; in effect, the "reach-back" is a "reach-forward" to later-available pitch spaces. Under certain circumstances a backward technique results in a smaller number of necessary state transitions (that is, the size of the transition table) than would an equivalent technique applied to a forward sequence of images desired to be printed.

E. Differential Optimal Scheduling Technique

In order to optimize efficient generation of schedules, one embodiment of the present invention proposes a "differential scheduling" technique for capturing the respective advantages of the forward greedy-algorithm and reach-back scheduling techniques. According to the differential scheduling technique, the controller 70 (as shown in FIG. 2) is designed to operate in a forward greedy-algorithm mode; for each new extension of the schedule with a new print requested, the greedy-algorithm solution is chosen, wherein the extension resulting in the fewest offsets (delays in the sequence of an individual image) for that particular iteration is always chosen. However, simultaneous with the output of a greedy-algorithm schedule, a parallel reach-back scheduling technique is employed as well. The schedules created by the two techniques are compared on an ongoing basis, and only when there is a difference between the greedy-algorithm schedule and the reach-back schedule does the reach-back schedule supersede the greedy-algorithm schedule.

The practical advantage of this differential scheduling technique stems from the fact that a "runtime routine" program can be provided to operate imager 22. This runtime routine outputs a sequence of code relating to what pages are to be output by imager 22 on an ongoing basis. Because of its continuous function, the runtime routine is particularly suited for the real-time scheduling of the greedy-algorithm technique. However, using differential scheduling, the controller 70 can run on a simple greedy-algorithm mode, and when this greedy-algorithm schedule differs from the reach-back schedule, the reach-back schedule can merely amend the greedy-algorithm schedule "on the fly" by causing a necessary delay in the printing of a particular pitch for long-term optimization.

The most important benefit of differential scheduling is in saving memory. As mentioned above, non-greedy scheduling techniques preferably retain many alternative possible schedule endings for each print. The retention of these multiple alternate placements take up far more memory than the single placement a greedy scheduler would make. However, in practice many or most placements of suitable schedules built by the reach-back technique would be the same as those that a greedy system would propose. Under the differential scheduling technique, a schedule ending by the reach-back technique is calculated, and where it is the same as would have been chosen by the greedy system, no schedule ending is stored at all. Only where the two methods differ is the reach-back schedule stored in a memory. Thus, at the time when there are many alternative possible schedules that must be remembered, only a small fraction of what would normally be stored in a formal reach-back scheduling system will actually be stored. Once the schedule is brought up to date, the shortest schedule from all the alternatives created by reach-back scheduling is chosen. Essentially, the differential scheduling system is a trade-off between extra computation (in effect, calculating one run of a reach-back schedule plus two runs of a greedy schedule) so that not as much information need be stored while running the reach-back method. As scheduling by the greedy algorithm technique is so fast compared to the reach-back schedule, the fact that a greedy algorithm is calculated in real-time does not present a major time-consumption problem.

Figure 4:
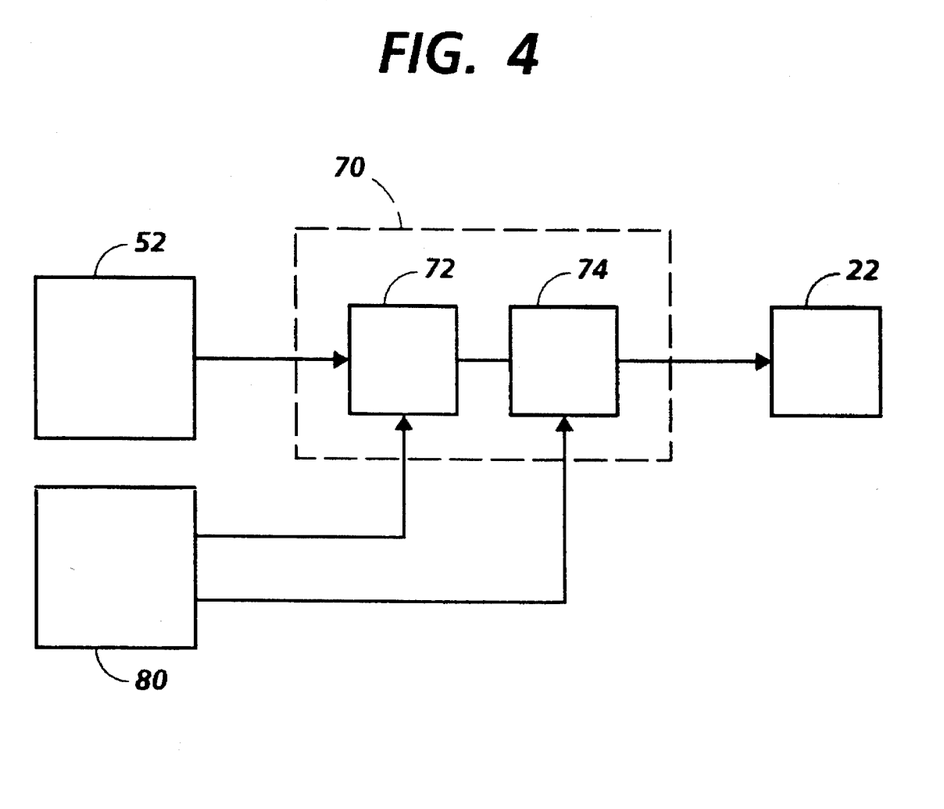
FIG. 4 is a systems diagram showing the concept of differential scheduling according to one aspect of the present invention.

FIG. 4 shows the operation of differential scheduling. As shown in FIG. 4, which shares the same elements as in FIG. 2, schedule 52 outputs a reach-back schedule to the central controller 70, which is here subdivided into a comparer 72 and runtime routine 74. Runtime routine 74 ultimately controls the sequence of images output by imager 22. Simultaneous with the ongoing calculation of reach-back schedules from schedule 52, is a greedy-algorithm scheduling technique carried out by greedy-algorithm scheduler 80 which can be in the form of, for example, a short computer program for carrying out greedy-algorithm scheduling. Greedy-algorithm schedule 80 outputs both to comparer 72 of central control 70 and the runtime routine 74.

In comparer 72, the schedules from reach-back scheduler 52 and greedy-algorithm schedule 80 are compared with each iteration of the schedule, for a predetermined number of pitch spaces. The two schedules will differ only to the extent that certain simplex or duplex blocks within the reach-back schedule 52 will appear in slightly different positions than in the greedy-algorithm schedule 80. One example of this is when the desired output is s d and the greedy-algorithm schedule will be s f - - - d and the reach-back schedule will be f - s - d. In such a case, the difference between the two schedules is that, in the optimal reach-back schedule, the s appears two pitches later than in the greedy-algorithm schedule. The s can be said to be two pitches "offset" in the reach-back schedule compared to the greedy-algorithm schedule. As it happens, such differences between schedules will always be of this type: that is, certain images will be produced counter intuitively later than would be apparent from the greedy algorithm. This relates to the fact that the key to long-term optimal scheduling is to minimize blank pitches over a whole schedule, and not necessarily to create any single image as early as possible. The comparer 72, having discovered this discrepancy between the two schedules, will intervene on the main greedy-algorithm schedule and provide therein the simple instruction to delay the production of the s image by two pitches. This simple instruction is all that is needed to reconcile the greedy-algorithm schedule so it is as efficient as the reach-back schedule. This technique of differential scheduling has been found to enable an overall image-selection program with significantly reduced memory consumption during the run of the forward reach-back technique. Comparer 72 thus submits to runtime routine 74 this simple delay instruction. Where there is no difference between the two schedules, the greedy-algorithm schedule just runs by itself.

F. Automatic Generation of Transition Tables

The nature of the transition table 60, as well as the nature of a particular duplex block such as f - - - d, will inevitably be directly related to the physical parameters of the printing apparatus, such as the length of the duplex loop 16, the length of the photoreceptor belt 18, the sizes of available sheets such as in trays 12a and 12b, and also any variable speed properties of the duplex loop or photoreceptor belt. Furthermore, it is conceivable that a color printing apparatus could be provided which would provide its own special circumstances which must be considered, such as a design in which the latent image is permitted to "ride" on the photoreceptor belt 18 for multiple complete rotations thereof, in order to receive multiple superimposed color separations forming a full-color image. In order to provide a versatile system which is capable of creating an optimal schedule for a given input of hardware and image parameters, generation of a particular transition table, such as shown as 60 in FIG. 2, can be done on an ad-hoc basis when a job is scheduled. A program for such ad-hoc transition table generation can be created using finite-state machine (FSM) techniques.

In brief, the generation of a transition table 60 for a particular job on a particular printing apparatus proceeds as follows. First, patterns of blocks which correspond to all possible schedule end sequences that could occur within the maximum possible reach-back when the printing apparatus is in use are generated by a pattern-generating program. Only those end sequences that are physically permissible with respect to the particular printing apparatus are retained; those sequences which are physically impermissible in the apparatus are excluded. (In the claims, such a list of permissible end sequences is called a "pattern set.") Then, for each generated end sequence in the pattern set for the hardware, a number of extensions are generated, each extension corresponding to a different way of scheduling a given additional print, such as a simplex or duplex print, onto each end sequence. Each generated end sequence is then combined with each possible extension and the resulting end sequence is computed. Thus, there is generated a set of "triples," with each triple comprising a starting end sequence, extension, and resulting end sequence. These triples are then used in a transition table such as 60 as shown in FIG. 2 or FIG. 3 above. As mentioned above, a transition table such as 60 represents a "closed system" by which, given a closed set of all the possible endings of a given schedule, the addition of a simplex or duplex extension to the schedule will result in another ending which has been identified within the closed set.

Once a particular table is generated for a particular hardware on a particular sheet size, only the transitions concerning this type of print on this type of hardware will be considered. Thus, when the initial ad-hoc table generation is carried out, it should preferably be organized, by the table creation program, into several sub-tables. Once the transitions are computed, the patterns themselves generally need not be retained in memory but are only indexed (for example, by an identifying number such as 1–16 in transition table 60 in FIG. 2) and only the sets of index numbers need be recorded in the resulting transition table.

For a versatile system in which transition tables for a given type of print size and a given type of hardware are generated as needed, it will be evident that the properties of the hardware, such as duplex loop length, will have an effect on the the maximum reach-back that the scheduling system is capable of, and the particular size of the print will have an effect on the nature of the duplex block, particularly in the amount of space between the f and d images forming the duplex print. In order to provide a system which is capable of being applied to various types of hardware and various sizes of prints, a preferred technique is to use a space which is expressed in terms of time. For example, if at a particular speed one rotation of the duplex loop 16 takes exactly nine seconds, the space in which the ending of the schedule can be created can be envisioned as a space marked off as 0 to 9,000 milliseconds; this would be the maximum reach-back of the scheduler. A typical sheet on such a duplex loop may take, for example, 2.5 seconds to pass a certain fixed point as it rides on the duplex loop 16; therefore the space allotted along the duplex loop for the single sheet would be 2,500 milliseconds. It will be noted that there is a direct correlation between time on the moving duplex loop 16 and the physical length of a sheet on the duplex loop 16. Thus, in this example, when creating a schedule the simplex block s is allotted a length of 2,500 milliseconds, while a duplex block requires in effect two pitches of 2,500 milliseconds each, with a space therebetween (in effect, the hyphens between f and d in the duplex block) of 6,500 milliseconds.

With the system generalized in milliseconds, a table generator can be facilitated which can take into account differing pitch sizes for various sized prints. For example, a physically larger print would require more milliseconds of time consuming each rotation of the duplex loop 16; if for example a letter-sized sheet required 2500 milliseconds, a sheet of twice the length as the sheet is arranged along the process direction of the loop would require an allotment of 5000 milliseconds. Similarly a longer sheet size relative to the total length of the duplex loop 16 would change the necessary time between the f and d images in a duplex print. Such a millisecond-based system could also be adapted to be able to account for varying process speeds of different types of hardware. The general formula mentioned above for configuring a duplex block in terms of pitch spaces, 1+i+b, can also be translated to the explicit time domain by multiplying the formula by a pitch-to-time conversion constant. For example, if each letter-sized pitch corresponds to 1.5 seconds (i.e., it takes 1500 milliseconds for a pitch-length portion of the duplex loop to pass a fixed point when the duplex loop is moving at a given speed), the duplex loop length for 8.5×11 sheets is (1+1+3)×1.5=7.5 seconds; for 11×17 sheets would be (1+2+3)×1.5=9 seconds. This timing can then be used to control the exact point in time at which the imager 22 begins to create a second-side image d for a duplex print. Such use of the "time domain" can also be used to facilitate compensating for unusual constraints; for instance, if one hardware constraint is to avoid placing an image over a seam on the photorecpetor belt, a system could be provided to delay creation of an image on the belt in an area which would overlap the seam. This constraint, which involves the photoreceptor belt 18, can also be reflected as delays in the behavior of the duplex loop 16.

G. Application of Scheduling Techniques to Multi-Pass Color Xerography

Although the above description of the various systems relating to the present invention have been described in detail above with regard to controlling the scheduling of the creation of images to optimize the use of a duplex loop and inverter, many of the general principles described above in relation to duplexing can be applied to other scheduling problems within a printing apparatus. In this section the application of the principles which have been described in detail in regard to duplexing will be shown to be generally applicable to the scheduling of "partial images" in the form of color separations (primary color portions of a full-color image, which are superimposed to yield the full-color image) in a multi-pass color xerographic printer.

Figure 5:
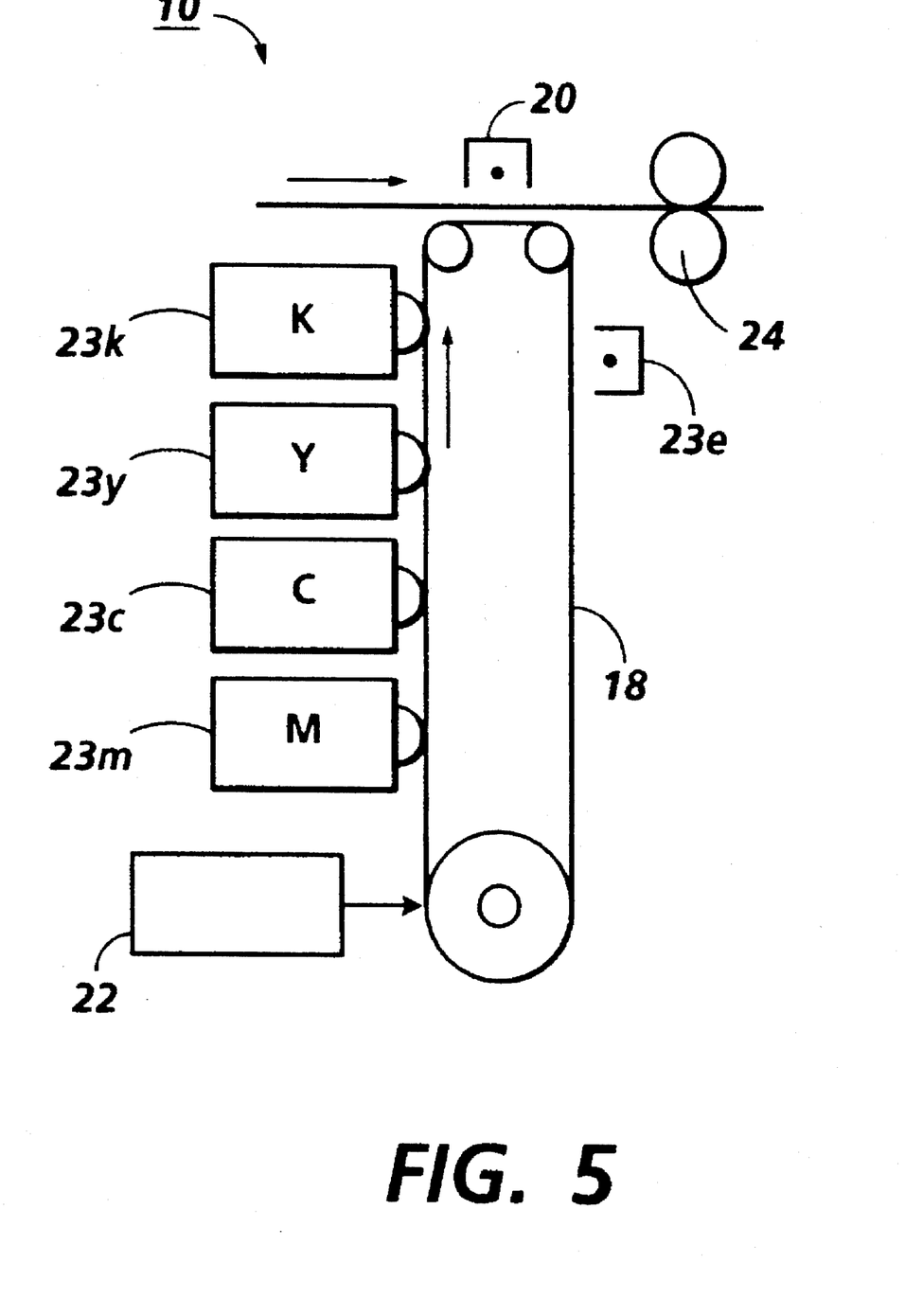
FIG. 5 is a simplified elevational view showing the relevant parts of a multi-pass color printing apparatus, on which the system of the present invention may operate.

FIG. 5 is a simplified elevational view showing the relevant portions of a full-color xerographic printer. As in the example of FIG. 1 above, there is an image receptor in the form of a photoreceptor 18 rotatable about a set of rollers, a transfer corotron 20 for transferring a developed image from photoreceptor 18 onto a sheet of paper or other substrate in contact with photoreceptor 18, and, downstream of corotron 20 in the path of a sheet, a fuser 24 for fusing and fixing the toner image on the substrate. Imager 22, which was generally illustrated in FIG. 1, is here shown in combination with four development stations downstream thereof along the process direction of photoreceptor 18. Each development unit 23m, 23c, 23y, and 23k dispenses a "print material," such as toner, corresponding to a primary color which can be used in creating a full-color image on the photoreceptor. As is known in the art, typical primary colors for use in such an application are magenta, cyan, yellow, and black, as indicated in FIG. 5, with K representing black in development unit 23k. Also appearing along the circumference of photoreceptor belt 18, downstream of the transfer corotron 20, is a cleaning device indicated as 23e, which will remove residual toner after the toner forming the image has been transferred to a sheet. As is familiar in the art of xerography, there may also be a charging corona (not shown) for initially charging or recharging the surface of photoreceptor 18 before selective discharge by the imager 22.

In a multi-pass full-color electrostatographic printing apparatus, there is provided one imager 22, typically in the form of a raster output scanner (ROS), LED bar, or ionographic or electrostatic head, which creates an electrostatic latent image on the surface of photoreceptor 18. The electrostatic latent image is subsequently developed by toner from a selected one of the development units 23, as required for a particular desired color. As is known in the art, when it is desired to print, for example, a full-color photograph from digital image data, a combination of color separations must be provided on the surface of the photoreceptor 18 in largely superimposed fashion. Each color separation represents an application of one primary color toner; by superimposing or placing small dots of various primary colors next to each other, the desired full-color image is achieved.

In a multi-pass architecture, there is a single imager 22, which selectably discharges a given area on photoreceptor 18 in only those areas which are subsequently to be developed by a particular development unit downstream of the imager 22. Thus, when printing a full-color photograph, in one pass of the rotating photoreceptor belt 18, imager 22 discharges the particular areas on the surface of photoreceptor 18 in order to leave an electrostatic latent image corresponding to those portions of the full-color image which are subsequently to be developed in one primary color, such as magenta by development unit 23m, with the other development units being inactivated for the cycle. The developed image then remains on the rotating photoreceptor 18 until it is once again in a position to be discharged by imager 22. In this second cycle, the image area, which already has magenta toner in the appropriate areas thereof, is once again imagewise discharged to leave an electrostatic latent image only in those areas requiring a cyan primary color; this electrostatic latent image is then developed by cyan development unit 23c, with the other development units being inactivated for the cycle. Thus, after two cycles, the magenta and cyan portions of the full-color image will have been placed on the photoreceptor 18 in the image area. Similarly, in a subsequent cycle the yellow portions of the full-color image will be imaged by imager 22 and subsequently developed by yellow development unit 23y, and finally the black portions of the image will be placed on the image area in a fourth cycle of the photoreceptor 18. Thus, to create a full-color image, the particular area of the photoreceptor 18 cycles past the imager 22 four times, being developed by one of the primary color development units 23 with each pass, until, at after the end of the fourth cycle, a complete full-color image is available for transfer to a sheet at transfer corotron 20.

If photoreceptor belt 18 is of such a size that multiple pitches (image areas) can be created along the circumference thereof, it will be apparent that a scheduling system could be provided generally similar to that described in detail above for scheduling the function of the inverter 30 in the apparatus of FIG. 1. On a network, wherein different printing jobs are sent to the printing apparatus from separate sources, it is conceivable that apparatus may receive requests to print not only full-color jobs, but also monochrome jobs, which would require typically only the black development unit 23k, or also "highlight-color" jobs, typically including black and one other primary color, which require only the black development unit 23k and one other development unit. While a full-color image in the multi-pass architecture requires four separate cycles of photoreceptor 18 on the image area in order to build-up a full-color image, it will be apparent that a monochrome image would not require being cycled four times on the photoreceptor 18: a monochrome image could be imaged by imager 22, developed by development unit 23k in the same cycle, and then almost immediately be transferred onto a sheet at transfer corotron 20. A highlight-color document need be cycled around the photoreceptor belt 18 twice, once for the black portion of the image and once for the other primary color. Thus, a monochrome image remains on the photoreceptor 18 for only one cycle at most, a highlight-color image must remain on the photoreceptor for two cycles, and a full-color image must remain on the belt for four cycles. With various types of images being scheduled on a single apparatus, an opportunity exists for the scheduling techniques akin to those described above in regard to duplexing to be applied to scheduling the creation of color separations by imager 22 on the rotating photoreceptor belt 18.

What follows is one possible example of how the above-described scheduling techniques could be applied to a multi-pass color electrophotographic printer.

Assume, given the constraints of the size of the desired images and the total length of the photoreceptor belt 18, that four image spaces, or pitches, can be fit along the circumference of photoreceptor belt 18. For printing a full-color image requiring four cycles of the photoreceptor 18, the first color separation to be imaged by imaging imager 22 in the illustrated architecture is the magenta separation, which can be represented by m. Once the m color separation is created on photoreceptor 18, that particular developed area on photoreceptor 18 must wait for three pitches before it becomes available to imager 22 again for creation of the cyan color separation c thereon. In terms of a "block" using the term in the same way as used above in regard to the duplex printing example, the block would look like m - - - c, with the dashes representing blank pitches along the photoreceptor circumference between the two separations. Further cycles of photoreceptor 18 to create the full-color image can be represented by a block m - - - c - - - y - - - k. In other words, to create the full-color image in one particular pitch space of a four-pitch photoreceptor belt, the instructions to imager 22 will be "create m separation, wait three pitches, create c separation, wait three pitches, create y separation, wait three pitches, create k separation." The blank pitches between color separations represent unused capacity for the printer. (For comparison, if the photoreceptor belt 18 were only two pitches in length, the block would look like m - c - y - k.) These blank pitches may be available, under certain architectural constraints, for the creation of other color separations for other images therein. If, for example, there were no other architectural constraints, the creation of two full-color images may look like mm - - cc - - yy - - kk, which requires only one more pitch space than is required for printing one full-color image.

The problem becomes more interesting when, such as on a network system having many users, full-color, highlight-color, and monochrome images are desired to be created at overlapping times. If a user submits to the printing apparatus a simple monochrome job, for example, each image pitch in the job will be a simple k. This k can be placed on a blank pitch within, for example, the full-color block m - - - c - - - y - - - k and indeed, if three pages of the monochrome job were desired, all of the three images could fit, for example, between the m and the c of the full-color block. A highlight-color image would require perhaps two passes past the imager 22 for development in two colors, such as cyan and black. Therefore, a highlight-color block would appear as something like c - - - k. If two primary highlight colors are required, or if the highlight color is in fact a combination of two primary colors, three passes may be required to yield a block such as c - - - y - - - k. Different requirements of full-color, highlight-color, and monochrome images can be arranged in an optimized manner to minimize the number of blank pitches along the photoreceptor belt 18, and also to avoid having partial images ride on the photoreceptor 18 for more cycles than necessary. It is conceivable that the above techniques such as forward and backward reach-back, and forward and backward greedy-algorithm, as well as combination techniques such as differential scheduling, could all be applied to optimizing the use of the photoreceptor 18. Of course, if color printing apparatus is used with duplex loop as in the FIG. 1 apparatus, the two systems of multi-pass color and duplexing will have to be coordinated with each other for system-wide optimization.

In the claims herein, the terms "simplex block" and "duplex block" are used in the context of any multi-pass imaging device, independent of the use of the same terms in the sense of a duplex and simplex print in the FIG. 1 apparatus. In other words, although the FIG. 5 embodiment of the present invention does not speak of simplex and duplex (one-sided and two-sided) prints, the term "simplex" can be applied to a multipass-color context. As applied to the apparatus of FIG. 5, a simple monochrome image represented by block k can be called a simplex block, while a highlight color block such as c - - - k, or a full-color block such as m - - - c - - - y - - - k could be referred to as a "complex" block, defined as having at least a first block representative of a first partial image to be created by the imager and and end block representative of a final partial image to be created by the imager which completes the desired image.

As used in the claims herein, the word "optimizing" should be taken to mean making a schedule or sequence ore efficient, i.e. closer to an optimal condition, and should not necessarily be construed to limit the claims to systems which yield provably optimal schedules under given conditions.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

We claim:

1. In a simplex-duplex printer comprising an imager for creating images on a side of a sheet, and an inverter for inverting the sheet to enable the imager to create an image on another side of the sheet to make a duplex print, the inverter including a duplex loop for temporarily retaining the sheet, a method for scheduling a sequence of images created by the imager, comprising the steps of:

providing a data structure including a schedule having a plurality of pitch spaces;

for each simplex print to be made by the printer, entering into a pitch space in the schedule a simplex block representative of the creation of the simplex print;

for each duplex print to be made by the printer, entering into pitch spaces in the schedule a duplex block representative of the creation of the duplex print, the duplex block comprising a front block representative of the creation of a first side of the duplex print and an end block representative of the creation of a second side of the duplex print, the front block and end block of each duplex block being spaced by a predetermined number of pitch spaces;

organizing a plurality of simplex blocks and duplex blocks within the schedule so that a sequence of simplex blocks and end blocks corresponds to a desired sequence of simplex and duplex prints in a job; and optimizing the sequence of simplex blocks and end blocks to minimize a number of blank pitch spaces within the schedule.

2. The method of claim 1, the optimizing step including the steps of accumulating in the schedule a list of simplex and duplex prints to be made in a forward sequence; and for a predetermined number of pitch spaces at the end of the forward sequence, selecting an arrangement of blocks, corresponding to the list of simplex and duplex prints, which minimize a number of empty pitch spaces within the predetermined number of pitch spaces to yield a reach-back sequence.

3. The method of claim 2, the optimizing step further including the steps of providing a transition table, the transition table being a table of possible new end sequences of the predetermined number of pitch spaces at the end of the forward sequence, each new end sequence resulting from addition of either a simplex block or a duplex block to a previous end sequence; and for each new print accumulated in the schedule, adding an appropriate simplex or duplex block to a current end sequence in the transition table, to yield a new end sequence of the predetermined number of pitch spaces.

4. The method of claim 3, the step of selecting an arrangement of blocks further including the steps of for each new print accumulated in the schedule, entering the current end sequence of the predetermined number of pitch spaces at the end of the forward sequence into the transition table, and retaining in a memory all possible new end sequences from the transition table;

selecting, from the set of all possible new end sequences for each new print accumulated in the schedule, a series of end sequences which collectively minimizes a number of empty pitch spaces over a plurality of prints to be made.

5. The method of claim 3, the step of providing a transition table including the steps of generating a pattern list of physically permissible end sequences of blocks within a predetermined number of pitch spaces;

adding one of a simplex block or a duplex block to each of the possible end sequences of blocks in the pattern list, thereby yielding a new end sequence; and identifying each new end sequence with an identical end sequence in the pattern list, thereby yielding a transition table in a form of a closed system.

6. The method of claim 2, the optimizing step further including the steps of for each print accumulated in the schedule, adding a simplex block or duplex block as required at the end of the schedule in a manner which minimizes a number of empty pitch spaces added to the schedule, to yield a greedy-algorithm sequence;

for a predetermined number of pitch spaces at the end of the forward sequence, counting a number of empty pitch spaces in the greedy-algorithm sequence and in the reach-back sequence; and when the number of empty pitch spaces in the greedy-algorithm sequence is greater than in the reach-back sequence, operating the printer according to the reach-back sequence, and otherwise operating the printer according to the greedy-algorithm sequence.

7. The method of claim 1, the optimizing step further including the step of for each print accumulated in the schedule, adding a simplex block or duplex block as required at the end of the schedule in a manner which minimizes a number of empty pitch spaces added to the schedule to yield a greedy-algorithm sequence.

8. The method of claim 1, the optimizing step including the steps of accumulating in the schedule a list of simplex and duplex prints to be made in a backward sequence from an end of a job; and for each print accumulated in the backward sequence, adding a simplex block or duplex block as required at the beginning of the backward sequence in a manner which minimizes a number of empty pitch spaces added to the schedule.

9. The method of claim 1, the organizing step including the step of avoiding successions of blocks within the schedule which are physically impermissible in the printer.

10. The method of claim 1, wherein the data structure is organized as a set of time units, and each simplex block and duplex block is construed as occupying a predetermined number of time units within the data structure, the number of time units associated with each simplex block and duplex block being related to the size of an image to be printed.

11. In a simplex-duplex printer comprising an imager for creating images on a side of a sheet, and an inverter for inverting the sheet to enable the imager to create an image on another side of the sheet to make a duplex print, the inverter including a duplex loop for temporarily retaining the sheet, a method for scheduling a sequence of images created by the imager, comprising the steps of:

providing a data structure including a schedule having a plurality of pitch spaces;

for each simplex print to be made by the printer, entering into a pitch space in the schedule a simplex block representative of the creation of the simplex print;

for each duplex print to be made by the printer, entering into pitch spaces in the schedule a duplex block representative of the creation of the duplex print, the duplex block comprising a front block representative of the creation of a first side of the duplex print and an end block representative of the creation of a second side of the duplex print, the front block and end block of each duplex block being spaced by a predetermined number of pitch spaces;

accumulating a sequence of simplex blocks and end blocks corresponding to a desired sequence of simplex and duplex prints to be made in a forward sequence;

providing a transition table, the transition table being a table of possible new end sequences of the predetermined number of pitch spaces at the end of the forward sequence, each new end sequence resulting from addition of either a simplex block or a duplex block to a previous end sequence; and for each new print accumulated in the schedule, adding an appropriate simplex or duplex block to a current end sequence in the transition table, to yield a new end sequence of the predetermined number of pitch spaces.

12. In a printing apparatus for creating monochrome and multicolor prints, the printing apparatus including a rotatable image receptor for accumulating print material in imagewise fashion, a plurality of selectably-actuable development units disposed along a path of the image receptor for dispensing print material onto a latent image created on the image receptor, and an imager disposed along the path of the image receptor for creating latent images on the image receptor, the printing apparatus being controllable to cause the imager to create partial images of a desired multicolor image and to enable print material relating to a plurality of partial images to be superimposed on an image area of the image receptor by causing print material relating to partial images to be retained on the image receptor through a plurality of rotations of the image receptor, a method for scheduling a sequence of latent images created by the imager, comprising the steps of:

providing a data structure including a schedule having a plurality of pitch spaces;

for each monochrome print to be made by the printer, entering into a pitch space in the schedule a simplex block representative of the creation of the monochrome print;

for each multicolor print to be made by the printer, entering into pitch spaces in the schedule a complex block representative of the creation of the multicolor print, the complex block comprising at least a first block representative of the creation of a first partial image of the multicolor print and an end block representative of the creation of a final partial image of the multicolor print, the first block and end block of each complex block being spaced by a predetermined number of pitch spaces;

organizing a plurality of simplex blocks and complex blocks within the schedule so that a sequence of simplex blocks and end blocks corresponds to a desired sequence of monochrome and multicolor prints to be output; and optimizing the sequence of simplex blocks and end blocks to minimize a number of blank pitch spaces within the schedule.

13. The method of claim 12, the optimizing step including the steps of accumulating in the schedule a list of prints to be made in a forward sequence; and for a predetermined number of pitch spaces at the end of the forward sequence, selecting an arrangement of blocks, corresponding to the list of prints, which minimize a number of blank pitch spaces within the predetermined number of pitch spaces to yield a reach-back sequence.

14. The method of claim 13, the optimizing step further including the steps of providing a transition table, the transition table being a table of possible new end sequences of the predetermined number of pitch spaces at the end of the forward sequence, each new end sequence resulting from addition of either a simplex block or a complex block to a previous end sequence; and for each new print accumulated in the schedule, adding an appropriate simplex or complex block to a current end sequence in the transition table, to yield a new end sequence of the predetermined number of pitch spaces.

15. The method of claim 14, the step of selecting an arrangement of blocks further including the steps of for each new print accumulated in the schedule, entering the current end sequence of the predetermined number of pitch spaces at the end of the forward sequence into the transition table, and retaining in a memory all possible new end sequences from the transition table;

selecting, from the set of all possible new end sequences for each new print accumulated in the schedule, a series of end sequences which collectively minimizes a number of blank pitch spaces over a plurality of prints to be made.

16. The method of claim 14, the step of providing a transition table including the steps of generating a pattern list of physically permissible end sequences of blocks within a predetermined number of pitch spaces;

adding one of a simplex block or a complex block to each of the possible end sequences of blocks in the pattern list, thereby yielding a new end sequence; and identifying each new end sequence with an identical end sequence in the pattern list, thereby yielding a transition table in a form of a closed system.

17. The method of claim 13, the optimizing step further including the steps of for each print accumulated in the schedule, adding a simplex block or complex block as required at the end of the schedule in a manner which minimizes a number of blank pitch spaces added to the schedule, to yield a greedy-algorithm sequence;

for a predetermined number of pitch spaces at the end of the forward sequence, counting a number of blank pitch spaces in the greedy-algorithm sequence and in the reach-back sequence; and when the number of blank pitch spaces in the greedy-algorithm sequence is greater than in the reach-back sequence, operating the printer according to the reach-back sequence, and otherwise operating the printer according to the greedy-algorithm sequence.

18. The method of claim 12, the optimizing step further including the step of for each print accumulated in the schedule, adding a simplex block or complex block as required at the end of the schedule in a manner which minimizes a number of blank pitch spaces added to the schedule.

19. The method of claim 12, the optimizing step including the steps of accumulating in the schedule a list of monochrome and multicolor prints to be made in a backward sequence from an end of a job; and for each print accumulated in the backward sequence, adding a simplex block or complex block as required at the beginning of the backward sequence in a manner which minimizes a number of blank pitch spaces added to the schedule.

20. The method of claim 12, the organizing step including the step of avoiding creating within the schedule successions of blocks which are physically impermissible in the printing apparatus.

21. The method of claim 12, wherein the data structure is organized as a set of time units, and each simplex block and complex block is construed as occupying a predetermined number of time units within the data structure, the number of time units associated with each simplex block and complex block being related to the size of an image to be printed.

* * * * *